US005740876A

United States Patent [19]
Shimose et al.

[11] Patent Number: 5,740,876
[45] Date of Patent: Apr. 21, 1998

[54] POWER PLANT SUPPORT DEVICE FOR A VEHICLE

[75] Inventors: Yoshifumi Shimose; Yasuki Matsuura, both of Kanagawa Pref., Japan

[73] Assignee: Nissan Motor Co., Ltd., Kanagawa, Japan

[21] Appl. No.: 166,982

[22] Filed: Dec. 15, 1993

Related U.S. Application Data

[63] Continuation of Ser. No. 920,226, Jun. 9, 1992, abandoned.

[30] Foreign Application Priority Data

Jun. 24, 1991 [JP] Japan .................. 3-151273

[51] Int. Cl.$^6$ .................................................. B60K 5/12
[52] U.S. Cl. ........................ 180/232; 180/300; 248/638
[58] Field of Search ........................ 180/232, 274, 180/298, 299, 300; 280/732; 248/646, 638

[56] References Cited

U.S. PATENT DOCUMENTS

| 3,347,501 | 10/1967 | Van Eimeren | 180/232 |
| 3,752,247 | 8/1973 | Schwenk | 180/232 |
| 3,851,722 | 12/1974 | Grosseau | 180/232 |
| 5,181,737 | 1/1993 | Lenzen et al. | 280/732 |

FOREIGN PATENT DOCUMENTS

| 2230233 | 1/1974 | Germany | 180/232 |
| 2246077 | 3/1974 | Germany | 180/232 |
| 2455790 | 6/1976 | Germany | 180/232 |
| 2-38135 | 2/1990 | Japan . | |

*Primary Examiner*—Brian L. Johnson
*Assistant Examiner*—Michael Mar
*Attorney, Agent, or Firm*—Lowe, Price, LeBlanc & Becker

[57] ABSTRACT

A power plant support device for a vehicle which includes a releasable first mount and second mount. The first mount has a releasing mechanism which releases a connection to the power plant upon an impact force larger than a predetermined impact force. The second mount rotatably supports the power plant and is located below the center of gravity of the power plant, but it has enough endurance to support against the predetermined impact force. When a front collision of the vehicle occurs and the power plant receives an impact force larger than the predetermined impact force, the connection between the first mount and the power plant is released and the power plant rotates about the second mount, so that the power plant moves away from a lower dash panel of the passenger compartment. Thus, the degree of crush of a framework of the vehicle increases and a larger shock can be absorbed.

13 Claims, 7 Drawing Sheets

POWER PLANT SUPPORT DEVICE FOR A VEHICLE

This application is a continuation of application Ser. No. 07/920,226 filed Jun. 9, 1992 now abandoned.

FIELD OF INVENTION

The present invention relates generally to a power plant support device for a vehicle, and more specifically to a power plant support device that prevents a power plant from striking a vertical panel by which a engine room and a passenger's compartment are divided when a colision of the vehicle occurs.

BACKGROUND OF PRIOR ART a power plant support device for a vehicle is disclosed in Japanese Patent First Provisional Publication No. 2-38135. This power plant support device is shown in FIGS. 11 and 12. This power plant support device is used in a 2-box or 3-box type front engine automobile which has an engine and a transmission combined as a power plant 9. An engine room 1 and a passenger's compartment 2 are divided by a lower dash panel 3. In front of lower dash panel 3, there are provided front side members 4 extending from rear to front with respect to the vehicle on both sides of engine room 1. The lower parts of the forward ends of front side members 4 are connected to a front cross member 5 extending from side to side with respect to the vehicle. A front center member 6, extending from rear to front with respect to the vehicle in lower place of engine room 1, is connected to front cross member 5 and to lower dash panel 3. Front side members 4, front cross member 5 and front center member 6 function as a framework of the vehicle. The first mount 8 is fixed to the rear part of front center member 6, and the second mount 7 is fixed to the front part. Mounts 7, 8 have elastic insulaters to which brackets 10, 11 of power plant 9 are connected by connecting means 12, 13, such as bolts and nuts. Thus, a cylinder block 9a of power plant 9 is supported upright. Both front center member 6 and power plant 9 have hooks 14, 15 facing each other. Front center member 6 has slopes on both front part and on rear part so that middle part of front center member 6 bends downward upon the shock of the front collision of the vehicle.

When a front collision of the vehicle occurs and front side members 4 are crushed, front center member 6 bends downward and its hook 14 pulls hook 15 of power plant 9 downward. Thereby, power plant 9 moves downward as well as rearward. As shown in FIG. 12, this prior art arrangement was expected to generate movement h of power plant 9 downward, and to increase the amount of the movement rearward by D1 as shown in solid line, as compared with a power plant support device without the above mentioned improvement as shown in the broken line. Thus, this prior art arrangement was expected to increase the amount of the crush of front side members 4 to absorb the shock upon the front collision.

However, the impact against the front side member 4 horizontally rearward must be transformed so as to bend front center member 6 downward to get the above effects. If the front center member 6 does not bend far enough downward for one reason or other, power plant 9 will not move downward as intended.

In order to clearly show the difficulty of the transformation of the power, a calculation is done as follows. Provided that power plant 9 moves for distant h downward during time period t with acceleration a by impact F downward, we can obtain the following equations.

$$h = (1/2) \cdot a \cdot t^2$$
$$F = M \cdot a$$
$$= M \cdot 2 \cdot h/t^2$$

According to above equations, necessary impact downward to move power plant for 100 mm downward during 15-20 msec after collision is, for example, 6.6-11.7 tons as shown in the following table.

| power plant mass | M | 130 kg | |
| movement downward | h | 100 mm | |
| period of movement | t | 15 msec | 20 msec |
| acceleration | a | 91 G | 51 G |
| necessary impact fource | F | 11.7 tons | 6.6 tons |

However, such a large impact downward is usually not generated unless all the impact upon front side member 4 horizontally rearward is transformed into the force downward. Accordingly, expected effects are not always achieved.

Furthermore, a power plant is apt to be designed to be supported slantwise recently, as shown in FIG. 13, to lower the height of power plant 99 and lower the engine hood (not shown) over engine room 1. With such slantwise power plant 99, even if front center member 6 bends well downward and front center member 6 moves power plant 99 downward with hooks 14, 15, a cylinder block 99a strikes lower dash panel 3 before a differential gear 96 gets under lower dash panel 3. In this case, the amount of movement of power plant 99 rearward does not increase although power plant 99 moves down as shown in the broken line in FIG. 13. Accordingly it is impossible for above prior art to increase the crush of front side member 4 to absorb the shock of a collision with respect to the slantwise power plant 99.

SUMMARY OF INVENTION

It is, accordingly, one object of the present invention to provide for a power plant support device for a vehicle which avoids the disadvantages of the prior art.

According to a preferable embodiment of this invention, there is provided a power plant support device for a vehicle which comprises first and second mounts fixed to a framework of the engine room of a vehicle and connected to a power plant, the first mount having release means for releasing the connection to the power plant upon an impact force larger than a predetermined impact force, the second mount rotatably supporting the power plant back and forth with endurance against the predetermined impact force.

BRIEF DESCRIPTION OF THE DRAWINGS

The present invention will be described with reference to the attached drawings wich are given as non-limiting examples only, in which.

DESCRIPTION OF PREFERRED EMBODIMENT

Figure 1:
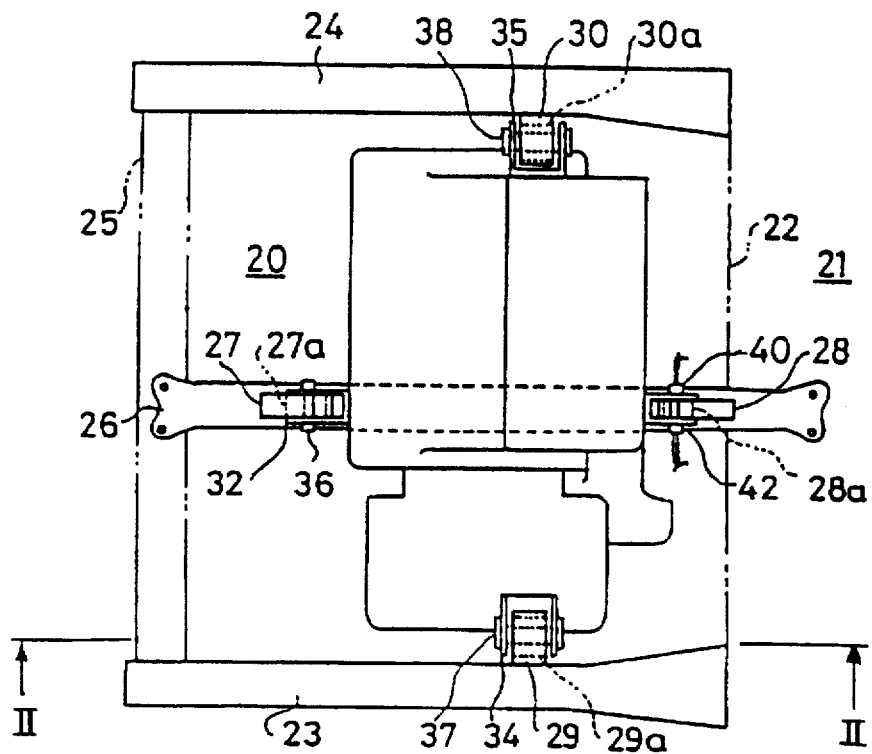
FIG. 1 is a plan view of a framework support device according to a preferred embodiment of the present invention.
Figure 2:
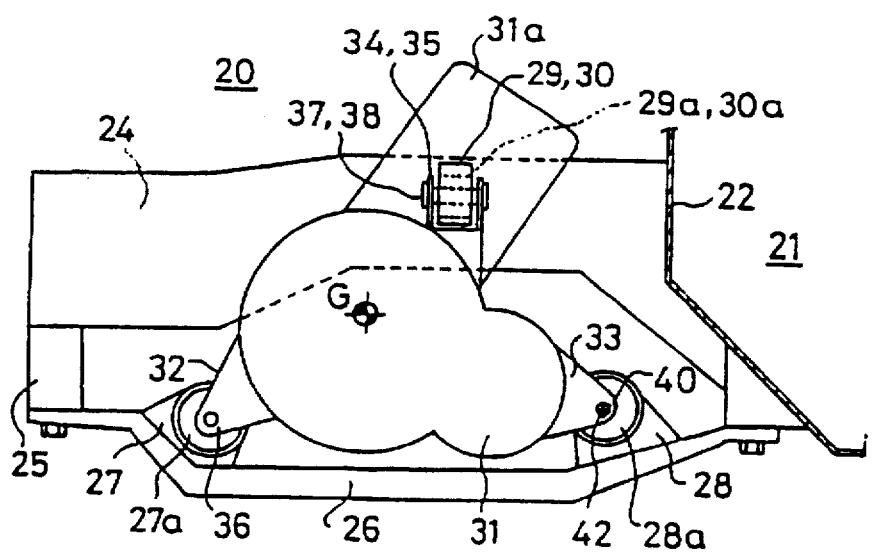
FIG. 2 is a side view of the power plant support device, partly in section at line II—II of FIG. 1.

FIGS. 1–7 show a preferred embodiment of this invention applied to a 2-box or 3-box type front engine automobile. As shown in FIGS. 1 and 2, engine room 20 and a passenger's compartment 21 are divided by a lower dash panel 22. In front of lower dash panel 22, there are provided front side members 23, 24 extending from rear to front with respect to the vehicle on both sides. The lower parts of the forward ends of front side members 23, 24 are connected to a front cross member 25 extending from side to side with respect to the vehicle. A front center member 26, extending from rear to front with respect to the vehicle in the engine room 20, is connected to front cross member 25 and to dash lower panel 22. Front side members 23, 24, front cross member 25, and front center member 26 function cooperatively as a framework of the vehicle.

Mounts 27, 28, 29, 30 are fixed to a front portion of front center member 26, to a rear portion of front center member 26, to front side member 23, and to front side member 24 respectively. Power plant 31 has U-shaped brackets 32, 33, 34, 35 on its lower front, lower rear, upper left side and upper right side. Mounts 27, 28, 29, 30 have elastic insulaters 27a, 28a, 29a, 30a to which U-shaped brackets 32, 33, 34, 35 of power plant 31 are connected respectively. Thus, power plant 31 is supported by connection between mounts 27, 28, 29, 30 and U-shaped brackets 32, 33, 34, 35, and a cylinder block 31a of power plant 31 slants toward lower dash panel 22. Mounts 29, 30 are arranged above the center of mass G of power plant 31, while amounts 27, 28 are arranged below the center of mass G as shown in FIG. 2.

Figure 3:
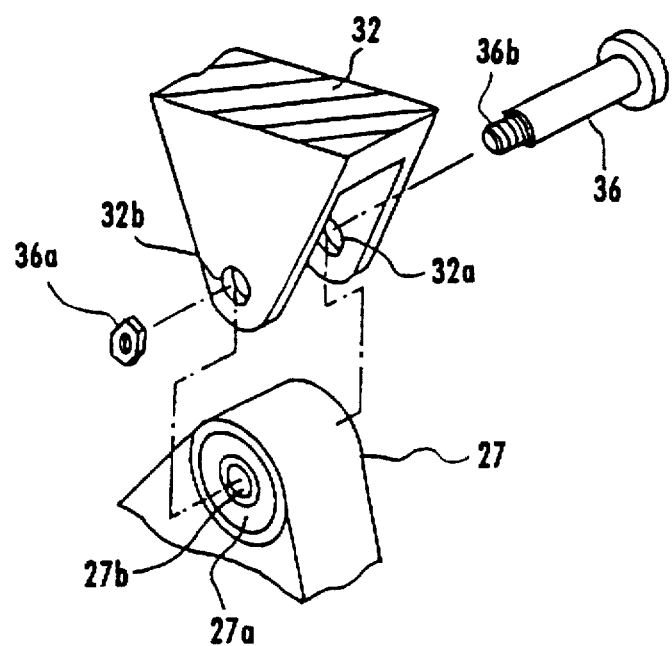
FIG. 3 is a perspective view of the first mount in a disassembled state.

The structure of mount 27 and bracket 32 is shown in FIG. 3. Insulater 27a is fixed into mount 27 and has a through-hole 27b. Bracket 32 also has holes 32a, 32b. A pin 36 passes through holes 32a, 27b, 32b and is fixed by connection between bolt threads 36b and nut 36a. Thus, upon impact rearward, power plant 31 can move about pin 36 which provide a pivot axis extending from side to side with respect to the vehicle.

Mounts 29, 30 are connected to brackets 34, 35 in the same manner as mount 27 is connected to bracket 32, that is, by pins 37, 38 through-holes of both brackets 34, 35 and insulaters 29a, 30a as shown in FIG. 1. Pins 37, 38 have axes extending rear to front with respect to the vehicle, and are aligned with one another on either side of the engine room 20, as shown in FIG. 1. Mounts 29, 30 allow power plant 31 to rotate back and forth upon large impact.

Figure 5:
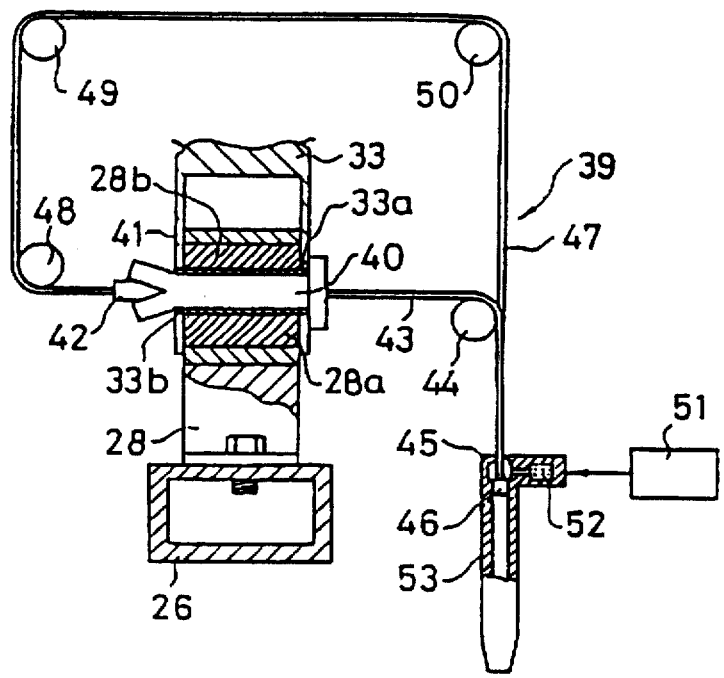
FIG. 5 is a sectional view of the second mount in an assembled state, taken along the line V—V of FIG. 4.
Figure 4:
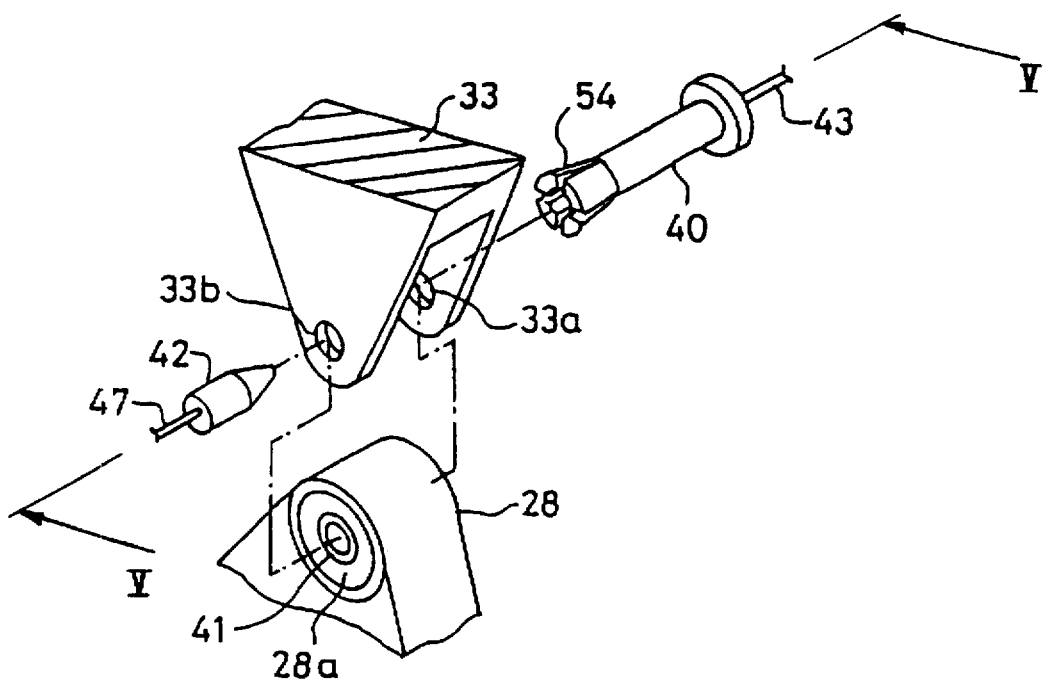
FIG. 4 is a perspective view of the second mount in a disassembled state.

FIGS. 4 and 5 show mount 28 with a releasing mechanism that releases power plant 31 upon an impact force larger than predetermined amount. Insulater 28a is fixed into mount 28 and has a pipe 41 preferably made of steel. Bracket 33 has holes 33a, 33b. A pin 40 has a forward end 54 which is split into four sections. The inside of these splits is cylinder-shaped so that a stopper 42 can be inserted therein. After pin 40 is inserted into hole 33a, pipe 41 and hole 33b, stopper 42 is inserted into forward end 54 so that the size of the forward end 54 becomes larger than the size of hole 33b. Thus, bracket 33 is connected to insulater 28a of mount 28. Pipe 41 makes it easier to insert the pin 40 because the split forward end 54 does not catch the insulater 28a on account of the existence of pipe 41 between insulater 28a and pin 40.

One end of wire 43, which coils around a roller 44, is connected to rear end of pin 40. The other end of wire 43 is connected to a piston 46. One end of wire 47, which coils around rollers 48, 49, 50, is connected to stopper 42. The other end of wire 47 is also connected to piston 46. Piston 46 is arranged in a cylinder 53 of a inflater 45. A gunpowder charge 52 is provided in an upper chamber of inflater 45. The gunpowder charge 52 explodes when an impact sensor 51 senses an impact force exceeding predetermined impact force. When gunpowder charge 52 explodes, piston 46 moves downward inside cylinder 53, pulls wires 43, 47 downward and releases the connection between pin 40 and stopper 42. Thus, bracket 33 is released from insulater 28a of mount 28. Rollers 50, 44 are preferably fixed to front side member 24, and rollers 48, 49 are preferably fixed to front side member 23. Inflater is also preferably fixed to front side member 24. The above predetermined impact force represents an impact force upon which front side members 23, 24 or front center member 26 begin to transform.

The function of above-mentioned embodiment is described as follows. When a front collision of the vehicle occurs and impact sensor 51 senses an impact force larger than predetermined impact, wires 43, 47 are pulled by inflater 45 and stopper 42 is released from pin 40. Thereby, bracket 33 is totally released from insulater 28a.

Figure 6:
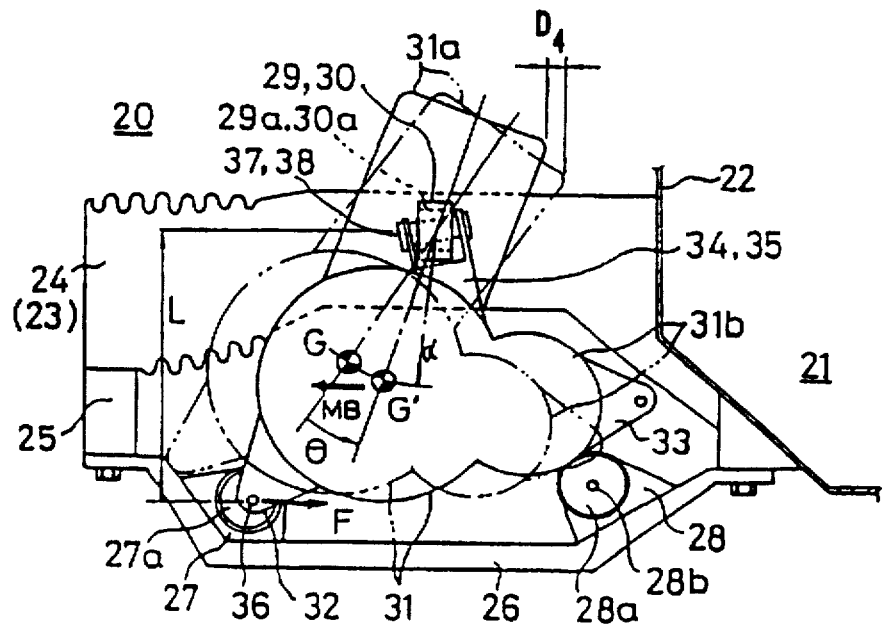
FIG. 6 is a side view, partly in section, of the power plant support device at a first stage of a position change after a front collision of the vehicle.
Figure 7:
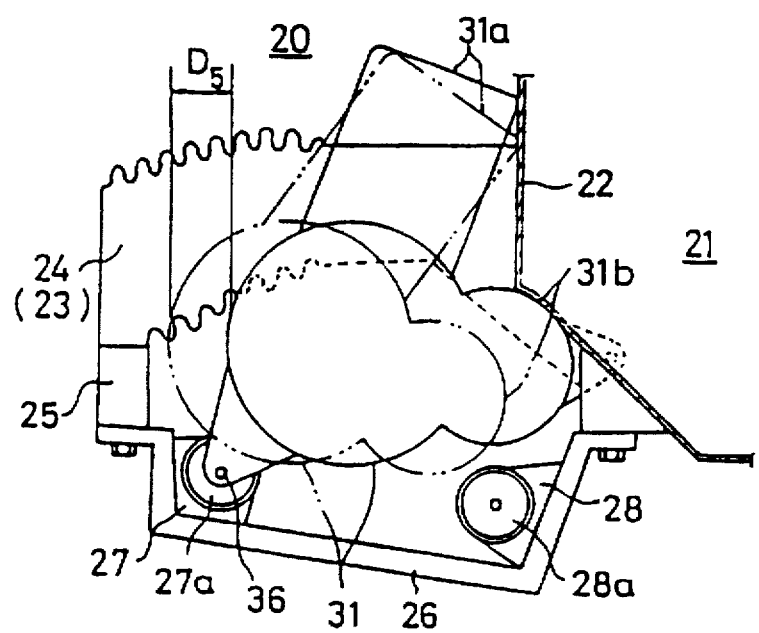
FIG. 7 is a side view, partly in section, of the power plant support device at a second stage of position change consequent to the state in FIG. 6.

As the transformation of the front body of the vehicle proceeds, impact force operates on front center member 26 through front side member 23, 24, as shown in FIG. 6. Then, the impact force F operating on front center member 26 is transmitted to power plant 31. Because of the elasticity of the insulaters 27a, 29a, 30a, the insulaters 27a, 29a, 30a can be deformed, and brackets 34, 35 incline with respect to mount 29, 30. At the same time, power plant 31 supported by pins 36, 37, 38 rotates by an angle θ counterclockwise and cylinder block 31a moves upward, as shown in the solid line with respect to the broken line in FIG. 6. Thereby, the center of mass of power plant 31 moves from G to G', cylinder block 31a moves away from lower dash panel 22 by D4, and differential gear 31b stays in a position where it can slide under lower dash panel 22.

When the transformation proceeds further, differential gear 31b slides under lower dash panel 22, while cylinder block 31a stays upward and the connections between brackets 32, 34, 35 and mount 27, 29, 30 are maintained. The movement rearward increases by D5 with respect to the situation in which cylinder block does not move upward, as shown in the broken line in FIG. 7. Accordingly, the amount of the crush of front side members 23, 24 and front center member 26 increases. Thereby, absorption of the shock also increases upon front collision of the vehicle.

Provided that power plant 31 rotates angle θ during time period t, and deceleration of the vehicle is B, the distance between pin 36 and pins 37, 38 is L, the distance between the center of mass G and pin 37, 38, the angular acceleration of power plant 31 is w and the moment of inertia of power plant 31 is I, the following equations are obtained.

$$I \cdot w = F \cdot L - M \cdot B \cdot d$$

$$w = 2 \cdot \theta / t^2$$

$$F = (I \cdot w + M \cdot B \cdot d)/L$$

According to above equations, the necessary impact force rearward to rotate for angle 20 degree during 15–20 msec is 3.8–6.0 tons as shown in the following table.

| | | | |
|---|---|---|---|
| power plant mass | M | 130 kg | |
| rotation angle | θ | 20° | |
| distance | L | 300 mm | |
| distance | d | 130 mm | |
| decelelation | B | 15 G | |
| moment of inertia | I | 500 kgfs$^3$ mm | |
| period of rotation | t | 15 msec | 20 msec |
| angular acceleration | w | 3111 rad/sec$^2$ | 1750 rad/sec$^2$ |
| necessary impact fource | F | 6.0 tons | 3.8 tons |

Compared with the necessary impact force F in prior art required to move the power plant, the necessary impact F in this embodiment is about half as much as that of prior art. Furthermore the direction of the necessary impact F in this embodiment is horizontally rearward, and not downward as in prior art. Therefore, no transformation downward is necessary. Accordingly, much more crush of the front side members 23, 24 or front center member 26 can be obtained than that of the prior art.

In addition to above-mentioned effect, because power plant support device of this embodiment has connections between brackets 34, 35 and mounts 29, 30, as well as connections between brackets 32 and mount 27, power plant 31 does not sway during or after the rotation. Therefore, power plant 31 is securely kept away from lower dash panel 22 by the distance D4, as shown in FIG. 6.

Figure 9:
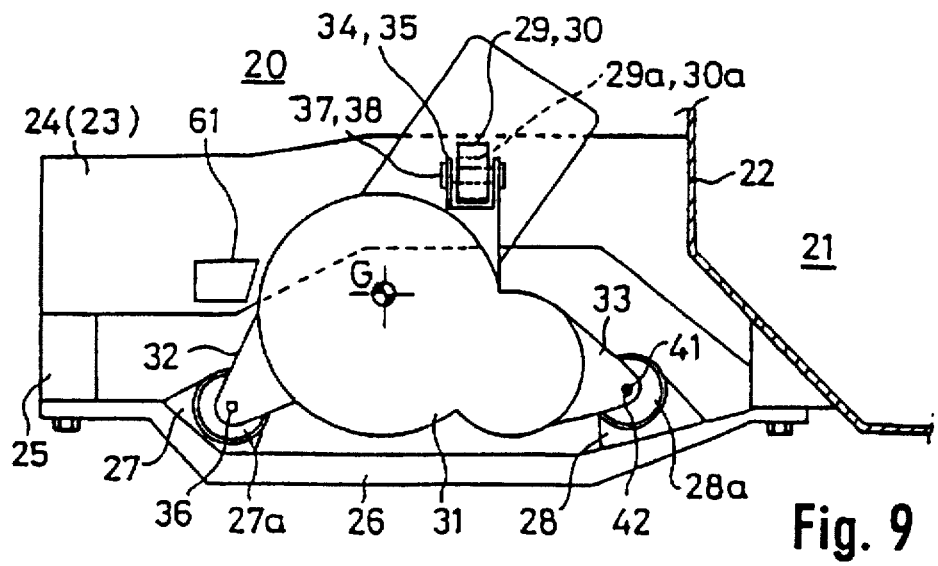
FIG. 9 is a side view of the power plant support device, partly in section at line IX—IX of FIG. 8.
Figure 8:
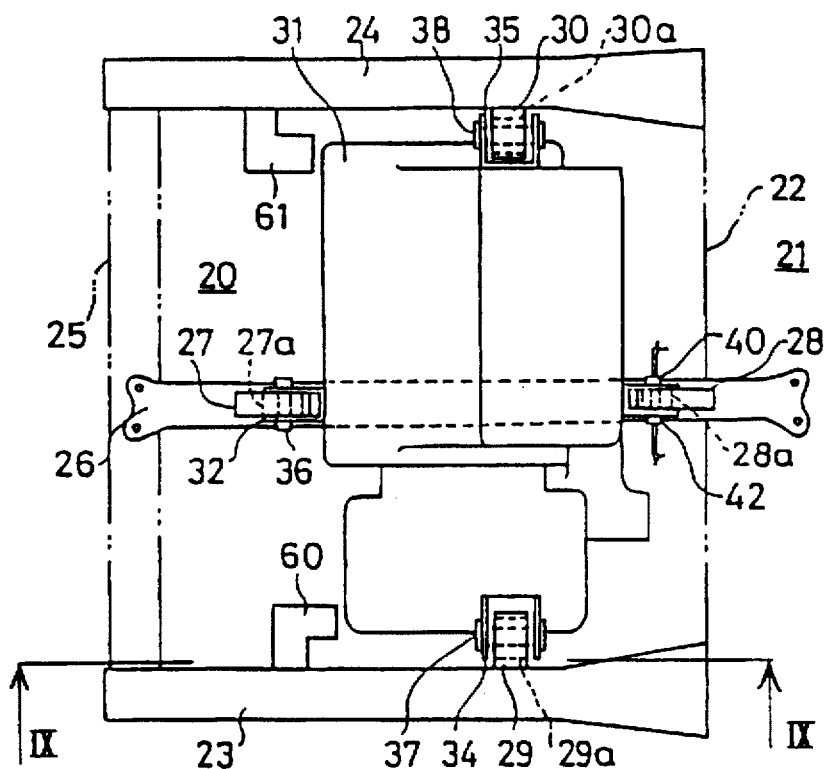
FIG. 8 is a plan view showing a power plant support device according to a second embodiment of the invention.

FIGS. 8 and 9 show a second embodiment of the present invention. In this embodiment, impact transmitters 60, 61 are provided on front side member 23, 24 in front of the center of mass G of power plant 31 with respect to the side view as shown in FIG. 9. There are provided some distances between power plant 31 and impact transmitters 60, 61. Other structure of this embodiment is the same as that of the first embodiment.

Figure 10:
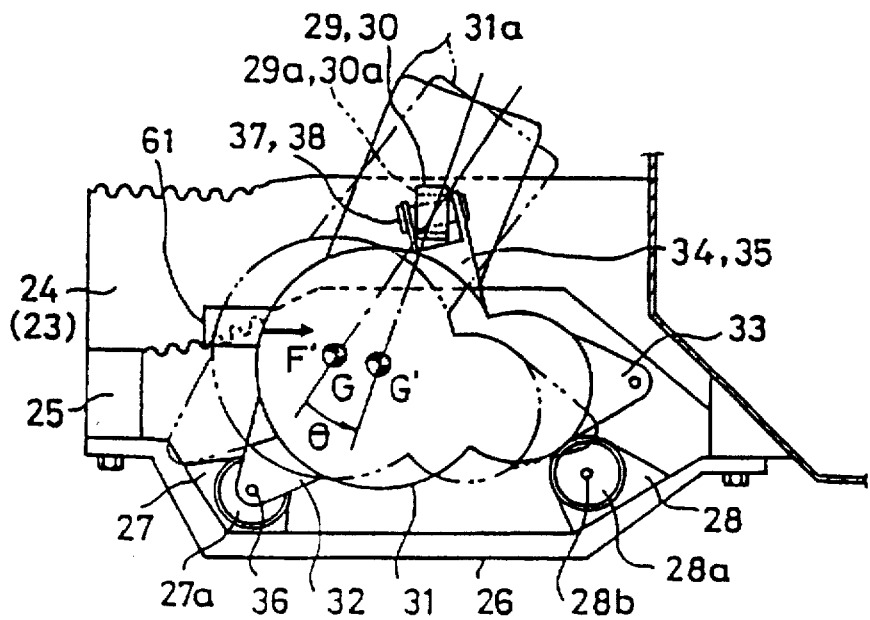
FIG. 10 is a side view, partly in section, of the power plant support device of FIG. 8 after a front collision of the vehicle.
Figure 11:
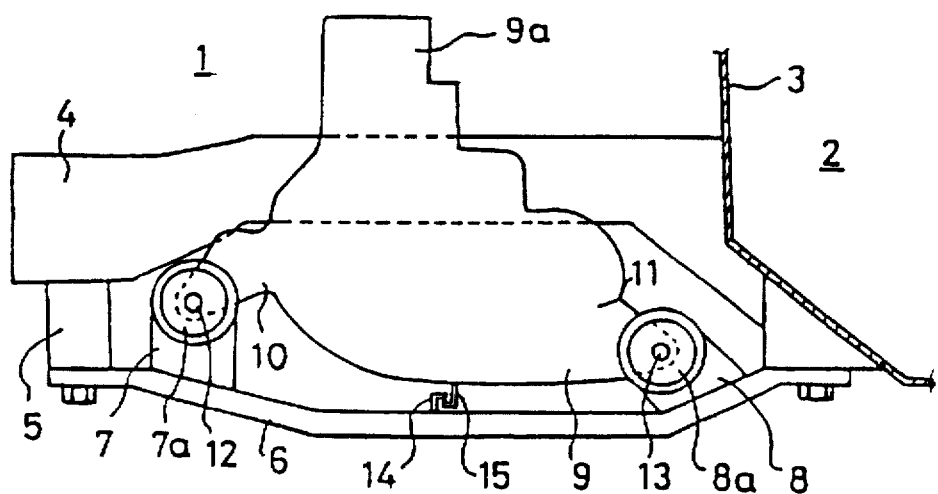
FIG. 11 is a side view, partly in section, of a conventional power plant support device.
Figure 12:
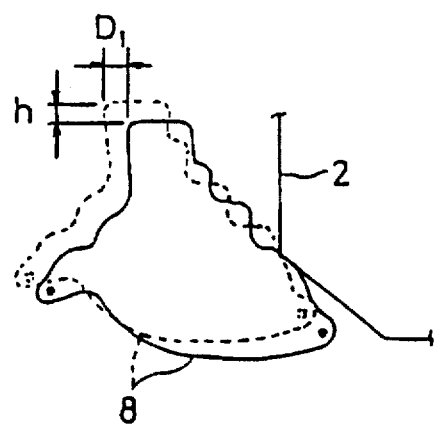
FIG. 12 is a sideview of the power plant and lower dash panel after a front collision of the vehicle.
Figure 13:
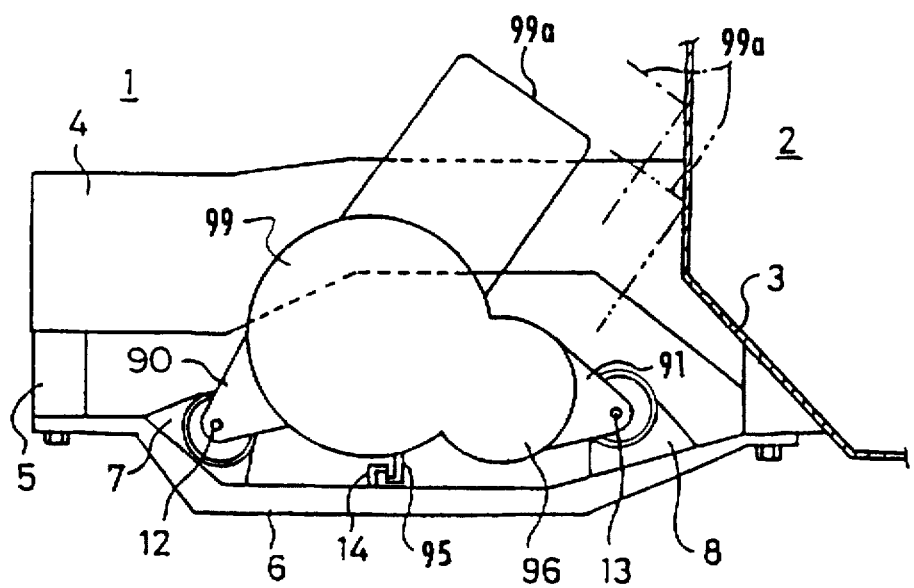
FIG. 13 is a side view, partly in section, of another conventional power plant support device with a slantwise supported power plant.

When a front collision of the vehicle occurs, front side members 23, 24 crush and impact transmitters 60, 61 strike power plant 31. According to this embodiment, in addition to the effect of the first embodiment, the following effects can be obtained. That is, even if an impact force of collision operates only on front side members 23, 24 and not on front center member 26, impact force F' can be transmitted from front side members 23, 24 to power plant 31 through impact transmitter 60, 61, as shown in FIG. 10. Thereby, power plant 31 can be caused to rotate counterclockwise with respect to pins 36, 37, 38 upon impact, after mount 28 releases bracket 33.

The foregoing description of the preferred embodiments which are for the purpose of illustrating the present invention is not to be considered as being limited or restricted thereto, since many modifications may be made by those skilled in the art without departing from the spirit and scope of the invention. For example, the connection between the bracket 33 and mount 28 could be released by an electromagnetic power, hydraulic pressure or air pressure other than by explosion of gunpowder charge 52. Or pin 40 could be so made that it is destroyed upon an impact force larger than a predetermined impact force. Furthermore, this invention can be applied not only to a front mounted engine automobile, but also to a midship or a rear mounted engine automobile.

What is claimed is:

1. A power-plant support device for a vehicle, comprising:
   first and second mounts supported to a framework of an engine compartment of the vehicle and connected to a power-plant,
   said first mount being located below a center of mass of the power-plant and comprising release means for releasing a connection to a rearward portion of said power-plant upon application of an impact force which is larger than a predetermined impact force and is applied from a front of the vehicle toward the rear thereof,
   said second mount rotatably supporting the power-plant being located forwardly of said first mount and forwardly of and at a lower height than a center of mass of the power-plant, said second mount being supported to said framework so as to cause the power-plant to be rotated so that an upper portion of the power-plant is moved forwardly and upwardly relative to the engine compartment and the rearward portion of the power-plant is moved upwardly upon the vehicle experiencing said impact force.

2. A power plant support device as set forth in claim 1, wherein:
   said release means comprises a releasing mechanism for mechanically releasing said power plant from said first mount; and
   an impact sensor for generating a signal upon sensing an impact larger than said predetermined impact force and sending said signal to actuate said releasing mechanism.

3. A power plant support device as set forth in claim 1, further comprising:
   a third mount rotatably supporting the power plant.

4. A power plant support device as set forth in claim 3, wherein:
   said third mount is arranged above said center of mass of said power plant.

5. A power-plant support device for a vehicle, comprising:
   first and second mounts connecting a framework of an engine room of the vehicle and a power-plant of the vehicle, said first mount comprising release means for releasing a connection between the frame work and a rearward portion of the power-plant upon application of an impact force larger than a predetermined impact force, said first mount being disposed in the vicinity of a vertical wall which divides an engine room and a passenger compartment of the vehicle, and said second mount being located at a forward side of the vehicle relative to said first mount, said second mount rotatably supporting the power-plant and being located at a lower height than a center of mass of the power-plant; and a contact member, mounted in the engine room, which non-releasably remains in contact with the power-plant, so that when the rearward portion of the power-plant is rotated upwardly with respect to said second mount in the event of a collision at a front end of the vehicle, a force opposing the rotation caused by the collision is applied to the power-plant by the contact member.

6. A power-plant mounting unit for a vehicle, comprising:

a mount connected to a framework of an engine compartment of the vehicle;

a bracket connected to a power-plant;

a pin connecting said mount and said bracket, said pin being forcibly removable to terminate said connection between said mount and said bracket;

a wire connected to said pin so as to release the connection between said mount and bracket by exerting a pulling force on the pin to forcibly remove the same; and an inflator adapted to be automatically actuated for pulling said wire in response to a sensed impact force larger than a predetermined amount is applied to the vehicle.

7. A power plant mounting unit as claimed in claim 6, wherein:

said inflator comprises a gunpowder charge which is exploded to cause a wire pulling operation of said inflator.

8. A power-plant support device for a vehicle, comprising:

a first mount fixed to a framework of an engine room of the vehicle and connected to a power-plant;

a second mount fixed to the framework and rotatably supporting the power-plant; and releasing means for releasing a connection between said first mount and the power-plant, said releasing means comprising a forcibly releasable pin connecting said first mount and the power-plant, a wire connected to said pin so as to release the connection between said first mount and the power-plant by exerting a pulling force on the pin, and an inflator adapted to be automatically actuated for pulling said wire in response to a sensed impact force, larger than a predetermined amount, being applied to the vehicle.

9. A power-plant support device for a vehicle, comprising:

first and second mounts fixed to a framework of an engine compartment of the vehicle and connected to a power-plant, said first mount comprising release means for releasing a connection to a rearward portion of said power-plant by means of a gunpowder charge upon application to a front portion of the vehicle of an impact force larger than a predetermined impact force, said second mount rotatably supporting the power-plant, said second mount being fixed to said framework forwardly of and at a lower height than a center of mass of the power-plant so as to be displaced by the impact to cause the power-plant to be rotated so that an upper portion of the power-plant is moved forwardly and upwardly relative to the second mount and the rearward portion of the power-plant is moved upwardly.

10. A power-plant support device for a vehicle, comprising:

first and second mounts fixed to a framework of an engine compartment of the vehicle and connected to a power-plant, said first mount comprising release means for releasing a connection to a rearward portion of said power-plant upon application to a forward portion of the vehicle of an impact force which acts in an impact force direction and is larger in magnitude than a predetermined impact force, said second mount rotatably supporting the power-plant and being located forwardly of said first mount such that a straight line connecting a center of mass of the power-plant and said second mount crosses a line in the direction of application of the impact force on the power-plant, the rearward portion of the power plant being moved upwardly upon the vehicle experiencing said impact force.

11. A power-plant mounting unit for a vehicle, comprising:

a mount connected to a framework of an engine compartment of the vehicle;

a bracket connected to a power-plant;

a pin extending through openings formed in said mount and in said bracket for connecting said bracket to said mount;

an inflator mechanism;

a first release wire connected at one end to a first end of said pin and at an opposite end to said inflator mechanism;

a stopper member received within a second end of said pin; and a second release wire connected at one end to said stopper and at an opposite end to said inflator mechanism, and wherein said inflator mechanism is activated in response to an impact force exceeding a predetermined amount applied to the vehicle to apply a pulling force to the wires, thereby releasing said bracket from said mount.

12. A power-plant support device for a vehicle, comprising:

first, second and third mounts, each fixed to a framework of an engine compartment of the vehicle and connected to a power-plant, wherein said first mount comprises release means for releasing a connection to a rearward portion of said power-plant upon application to a forward portion of the vehicle of an impact force larger than a predetermined impact force, said second mount is located forwardly of said first mount and rotatably supports the power-plant, said second mount being located such that a straight line connecting a center of mass of the power-plant and said second mount crosses with a line in the direction of application of the impact force, and said third mount is disposed above the center of mass of the power-plant and rotatably supports the power-plant, the rearward portion of the power plant being moved upwardly upon the vehicle experiencing said impact force.

13. A power-plant support device for a vehicle, comprising:

first, second and third mounts fixed to a framework of an engine compartment of the vehicle and connected to a power-plant, wherein said first mount is mounted below a center of mass of the power-plant and comprises release means for releasing a connection to a rearward portion of said power-plant upon application of an impact force which is larger than a predetermined impact force and is applied from a front of the vehicle toward a rear thereof, said second mount rotatably supports the power-plant, said second mount being located forwardly of said first mount and forwardly of and at a lower height than a center of mass of the power-plant, said third mount is disposed above the center of mass of the power-plant and rotatably supports the power-plant, said first, second and third mounts cooperatively supporting the power-plant such that when the predetermined impact force is applied to the front of the vehicle the power-plant is rotated so that an upper portion of the power-plant is moved forwardly relative to the engine compartment and upwardly relative to the second mount, and the rearward portion of said power plant is moved upwardly.

* * * * *